United States Patent [19]

Bobier et al.

[11] Patent Number: 4,847,546

[45] Date of Patent: Jul. 11, 1989

[54] SOLAR PANEL OUTPUT ENHANCEMENT CIRCUIT

[75] Inventors: Joseph A. Bobier, St. Mary's; Gerald E. Brown, Parkersburg, both of W. Va.

[73] Assignee: Bobier Electronics, Inc., Parkersburg, W. Va.

[21] Appl. No.: 172,294

[22] Filed: Mar. 23, 1988

Related U.S. Application Data

[63] Continuation-in-part of Ser. No. 35,397, Apr. 7, 1987, abandoned.

[51] Int. Cl.$^4$ ............................................. H02J 7/00
[52] U.S. Cl. ....................................... 320/21; 320/19; 320/39; 363/56; 323/282; 323/303; 323/906
[58] Field of Search ...................... 320/21, 39, 40, 15, 320/19; 323/282, 299, 303, 906; 363/56

[56] References Cited

U.S. PATENT DOCUMENTS

| | | | |
|---|---|---|---|
| 3,384,806 | 5/1968 | Hartman | 323/906 |
| 3,602,794 | 8/1971 | Westhaver | 320/39 |
| 4,536,699 | 8/1985 | Baker | 323/281 |
| 4,636,931 | 1/1987 | Takahashi et al. | 323/906 |
| 4,714,871 | 12/1987 | Craft et al. | 323/282 |
| 4,742,291 | 5/1988 | Bobier et al. | 323/906 |
| 4,750,102 | 6/1988 | Yamano et al. | 323/906 |

Primary Examiner—Patrick R. Salce
Assistant Examiner—Anita M. Ault
Attorney, Agent, or Firm—Mueller and Smith

[57] ABSTRACT

A circuit for operation with solar panels exhibiting constant current and variable voltage characteristics. The power output of the panels is maximized by the circuit through the use of a step-down form of regulator which functions to monitor the peak voltage level of the panel and regulate with a switching type regulator in accordance therewith. Thus, peak voltage levels are maintained while current output to the load driven by the panels is enhanced. When employed for battery charging, the circuit includes a threshold selection network which identifies the nominal voltage rating of the battery under charge and provides appropriate adjustments to carry out a pulse charging technique. For start-up conditions wherein battery voltages may be below levels requisite to evaluate nominal rated voltages, a higher level charging voltage is applied for a predetermined short interval until adequate threshold is achieved to make appropriate determinations of rated voltage values. In one embodiment of the current boosting circuit, the gate capacitance of a field effect transistor type regulator switching component is taken advantage of to simplify circuit structure.

44 Claims, 6 Drawing Sheets

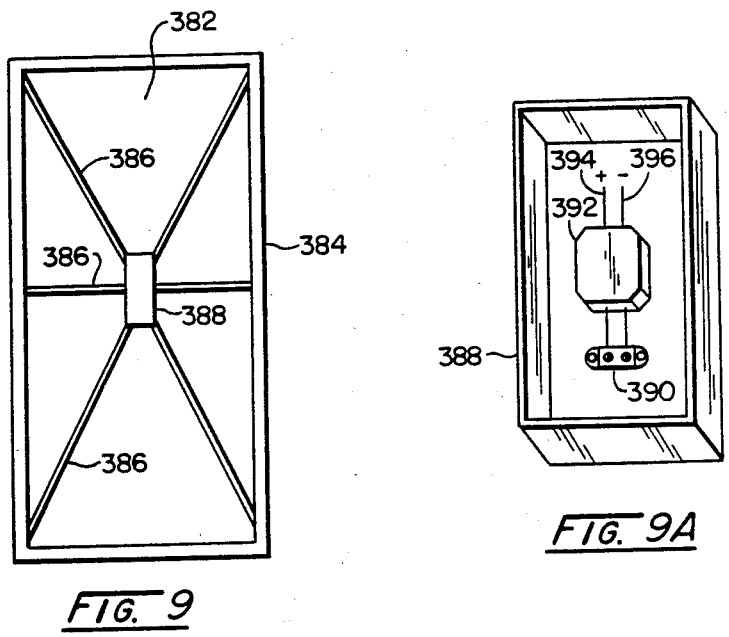

SOLAR PANEL OUTPUT ENHANCEMENT CIRCUIT

CROSS-REFERENCE TO RELATED APPLICATION

This application is a continuation-in-part of application Serial No. 07/035,397, filed Apr. 7, 1987, now abandoned entitled "Solar Panel Output Enhancement Circuit."

BACKGROUND

Photovoltaic solar panels are finding expanded use both by industry and in the home environment not only as an alternate energy source to supplement conventional utility power, but for many "stand alone" applications in isolated regions. For the most part, the solar panel installations are structured to perform in conjunction with rechargeable batteries, direct application of the panel outputs to other types of loads being somewhat limited by their performance characteristics. In the latter regard, a typical solar activated photovoltaic panel will exhibit a peak power characteristic having an output voltage for example at 16 volts which diminishes in the presence of loading and further will exhibit a substantially constant current, i.e. 1 amp which remains constant notwithstanding the noted voltage alterations. As a consequence of this characteristic, the panels usually are not operated at their optimum power capacities. Typically, manufacturers of the panels produce them in panel units exhibiting nominal 16 volt level peak power characteristics with a constant 1 amp current output. Thus, for an installation, for example, where a solar panel is employed in a charging relationship with a 12 volt battery, a 16 volt or 32 volt panel combination may be selected. Similarly, where a 24 volt battery installation is to be charged, the noted panel combination exhibiting 32 volts at peak power characteristic may be employed. Because the panel output voltage will be drawn down to the battery voltage in a recharging relationship, even though the current values remain stable, a resultant drop in available wattage for this recharging function becomes significant. As a consequence, the extent of solar panel usage must be enhanced to accommodate for this performance below the peak power capabilities of the panels.

Where photovoltaic solar panels are employed to power other forms of loads such as refrigeration compressor motors or the like, a similar enlargement of the panel array must be provided to accommodate for the temporarily encountered heavier start-up power demands. For example, a refrigeration motor may require 60 watts in continuous normal operation but an 80 watt start-up demand. Thus, this form of transient load will draw down peak voltage of the panels, however, the corresponding current levels will not be increased to maintain power. As a consequence, the powering of such loads from a photovoltaic panel array requires a significant expansion in expensive panel capacity to meet a temporary load demand.

From the foregoing it may be observed that significant improvements in the efficiencies of the photovoltaic solar panel powering systems can be realized if they can be operated such that their peak power voltage levels are maintained. Such performance would permit panel assemblages of lesser extent and important reductions in the cost of a given installation. Further, a much broadened range of applications of these power sources would become available.

SUMMARY

The present invention is addressed to apparatus for enhancing the power related performance of solar panels and the like in which a switching regulator form of circuit is employed to boost output currents in accordance with load demand, while peak power generating source voltage levels are maintained. In an embodiment for carrying out the charging of storage batteries, the apparatus includes a circuit which monitors the instantaneous values of the solar panel energy source and carries out switching regulation in a manner maintaining the predetermined peak power producing voltage levels for the panels. Preferably, this charging circuit is controlled so as to provide a pulse charging of the storage battery coupled thereto. With this form of charging, the battery is charged to a condition approaching an incipient boiling or gassing state of its electrolyte. Charging then is stopped and the voltage levels of the battery are permitted to relax to a predetermined level such as the floating or rest level for the battery. At this level, charging again is commenced to the noted incipient gassing state and so on in a pulsing fashion. Ultimately, a fully charged condition is reached at a charge level intermediate the rest level and the noted level of incipient gassing.

As another aspect of the invention, threshold selecting circuitry is provided such that the battery charging apparatus automatically will adjust to carry out the charging of batteries of different nominal voltage ratings such as 12 volts and 24 volts. To accommodate for conditions of battery charge which exhibit voltage levels so low that the batteries do not lend themselves to detecting their nominal voltage rating, a start-up charge network is provided which functions to initially charge the batteries upon their being coupled to the circuit at a higher nominal voltage rating mode configuration for a predetermined short interval selected such that they reach a characteristic threshold voltage. Once this voltage is achieved, then the threshold selection circuit is capable of discerning the appropriate voltage rating for the battery under charge.

Another aspect of the invention provides an output or power enhancement circuit for driving a load from an energy source having an output exhibiting variable voltage levels including a peak voltage level and substantially constant current. This circuit provides a step-down circuit including a solid-state switch which is actuable between conducting and non-conducting states and is connectable with the source output. An inductor is provided which is connectable intermediate the switch and the load for conveying current thereto from the source when the switch is in its conducting state. Further, a unidirectional conducting device such as a free-wheeling diode is connectable with the load for conveying current from the inductor when the switch is in its non-conducting state. A source monitoring network is provided which is responsive to the source variable voltage levels for providing a source monitoring output. A control circuit responds to the source monitoring output for actuating the switch to derive a duty cycle selected to substantially maintain the source established peak voltage level so as to optimize energy transfer therefrom to the load. In an advantageous embodiment, the solid-state switch is provided as a field effect transistor having a gate exhibiting gate capacitance and the control circuit incorporates a gate switching network for alternately charging and discharging the noted gate capacitance to derive the respective conducting and non-conducting states.

As another feature of the invention, apparatus is provided for charging the battery exhibiting variable charge state voltage levels from the output of a solar panel energy source which exhibits variable voltage levels and substantially constant current which includes a step-down circuit including a solid-state switch actuable between conducting and non-conducting states. The switch is connectable in switching relationship with the source output. An inductor is provided which is coupled with the switch and is connectable in charging relationship with the battery for conveying current thereto from the source when the switch is in its conducting state. A unidirectional conductor such as a free-wheeling diode is connectable in charging relationship with the battery for conveying current from the inductor when the switch is in its non-conducting state. Switch control is provided which is responsive substantially only to the source variable voltage levels for actuating the switch, when enabled from a disabled condition at switching rates controllably varied; to substantially maintain a predetermined high value of the voltage levels exhibited by the source so as to optimize energy transfer to said battery. A charge monitor is incorporated which is responsive to the battery charge state voltage level for selectively enabling the switch control to effect charging the battery to a fully charged condition.

As another aspect and feature of the invention an apparatus is provided for charging first and second batteries which exhibit variable charge state voltage levels and are chargeable at respective select first and second levels of charge from an energy source. Apparatus includes a step-down regulator having a charging output connectable with a battery and including a control circuit which responds to a charge signal, the charging output and one of first and second threshold conditions for deriving one respective first and second battery level of charge. A charge monitor responds to the charge state condition of a first or second battery corresponding with one respective third and fourth selective threshold condition representing a fully charged state of the first and second batteries for deriving the charge signal and a threshold selection network is provided which is responsive to the variable charge state voltage levels for deriving the first threshold condition and deriving the second and fourth threshold conditions when the charge state voltage level exceeds a predetermined maximum charging level of the first battery.

Another feature of the invention provides an output enhancement circuit for driving a load from an energy source such as a solar cell having an output exhibiting variable voltage levels including a peak voltage level and substantially constant current. The enhancement circuit includes an energy storage component such as a capacitor connectable across the output and which is chargeable by the current to variable charge levels. A solid-state switch is connected in energy transfer relationship with the energy storage device and is actuable between conducting and non-conducting states and an inductor is connected with the solid-state switch and, in turn, is connected to a load. The inductor conveys current to the load from the energy source and the energy storage component when the solid-state switch is in a conducting state. Unidirectional conducting means such as a free-wheeling diode are connectable with a load for conveying current to such load from the inductor when the solid-state switch is in a non-conducting state. A switch control network is provided having a first input responsive to a charge level responsive signal corresponding with the charge levels of the energy storage component and a second input responsive to a reference level as well as switching output coupled with the solid-state switch reference network for deriving the reference signal. The switch control network actuates the solid-state switch into conduction when the storage level responsive signal exceeds a reference level and actuates the switch into a non-conducting state when the charge level responsive signal is below that reference level. The enhancement circuit may be incorporated with a solar panel assembly of a variety including a panel component having a photovoltaic region mounted upon a supportive substrate. The photovoltaic region has a panel output exhibiting the noted variable voltage level as well as the noted peak voltage level and substantially constant current. An electrical junction arrangement is mounted with the panel for receiving the panel output and which has external output terminals for connection with a load. The above-described output enhancement circuit then is mounted with the electrical junction and the energy storage component is coupled across the panel output, while the inductor as well as the uni-directional conducting device are connected with the external output terminals of the panel.

As another aspect and feature of the invention, an output enhancement circuit is provided serving to drive a load from an energy source such as a solar cell having output exhibiting variable voltage values including a peak voltage level and substantially constant current. The enhancement circuit includes a energy storage component such as a capacitor connectable across the output and which is chargeable by the current to variable charge levels. A solid-state switch is connected in energy transfer relationship with the energy storage device and is actuable between conducting and non-conducting states and an inductor is connected with a solid-state switch and, in turn, is connected to a load. The inductor conveys current to the load from the energy source and the energy storage component when the solid-state switch is in a conducting state. Uni-directional conducting means such as a free-wheeling diode are connectable with a load for conveying current to such load from the inductor when the solid-state switch is in a non-conducting state. A switch control network is provided having a first input responsive to a charge level responsive signal corresponding with the charge levels of the energy storage component and a second input responsive to a reference level, as well as a switching output coupled with the solid-state switch. The switching output is provided including an emitter-follower stage arrangement for enhancing the current values asserted therefrom. The switch control network actuates the solid-state switch into conduction when the storage level responsive signal exceeds a reference level and actuates the switch into a non-conducting state when the charge level responsive signal is below that reference level.

The enhancement circuit also may be employed with a supplementary power stage including a supplementary energy storage component such as the noted capacitor which is connectable across the solar cell output. A supplementary solid-state switch is provided connected in energy transfer relationship with the supplementary energy storage device or capacitor and is actuatable between conducting and non-conducting states. A supplementary inductor is connected with the supplementary solid-state switch and the load for conveying current from the load from a source and supplementary storage device when the supplementary solid-state switch is in its conducting state. Additionally, a supplementary and uni-directional conducting device such as a freewheeling diode is connectable with a load for conveying current thereto from the supplementary inductor when the supplementary solid-state switch is in its non-conducting state. The supplementary solid-state switch is connected to the switching output of the switch control network such that the latter network actuates the supplementary solid-state switch into conduction when the storage level responsive signal exceeds the noted reference level and actuates the supplementary switch into its non-conducting state when the charge level responsive signal is below the reference level.

Other objects of the invention will, in part, be obvious and will, in part, appear hereinafter. The invention, accordingly, comprises the apparatus possessing the construction, combination of elements and arrangement of parts which are exemplified in the following description.

For a fuller understanding of the nature and objects of the invention, reference should be had to the following detailed description taken in connection with the accompanying drawings.

BRIEF DESCRIPTION OF THE DRAWINGS

FIG. 9 is a plan schematic view of a solar panel incorporating the output enhancement circuit of the invention; and FIG. 9A is a pictorial representation of a junction box formed with the panel of FIG. 5.

DETAILED DESCRIPTION

In its more general application, the invention is installed as an interface between a solar panel and a load, the latter, for example, being provided as a storage battery requiring charging or some motorized load operable from a d.c. energy source. This circuit permits a more efficient operation of the solar panel, inasmuch as it functions to essentially maintain more efficient voltage levels of the solar panel while linearizing or generating a varying voltage output from the otherwise constant current source output characteristic. Thus, for battery charging applications, the available charging current from the panel source is increased considerably, for example in the 17 to 25 percent range. For some, more resistance characterized loads or motors 600% to 800% current gains have been witnessed as a result of the circuit. As a consequence, equivalent charging power can be realized from a given solar installation with a lesser extent of panel installation. This presents economies of original installation cost.

The energy enhancement technique of the invention may be employed to maximize the output of a solar panel or the like by maintaining the panel voltage at levels maintaining its peak power generating capability. In a preferred embodiment, the voltage level output of the panel itself is monitored and substantially maintained notwithstanding the demands of the imposed load. With this arrangement, loads such as motors or the like may be driven with accommodation for such temporary power demands as occur at start-up and the like without resort to expanded panel capabilities.

Figure 1:
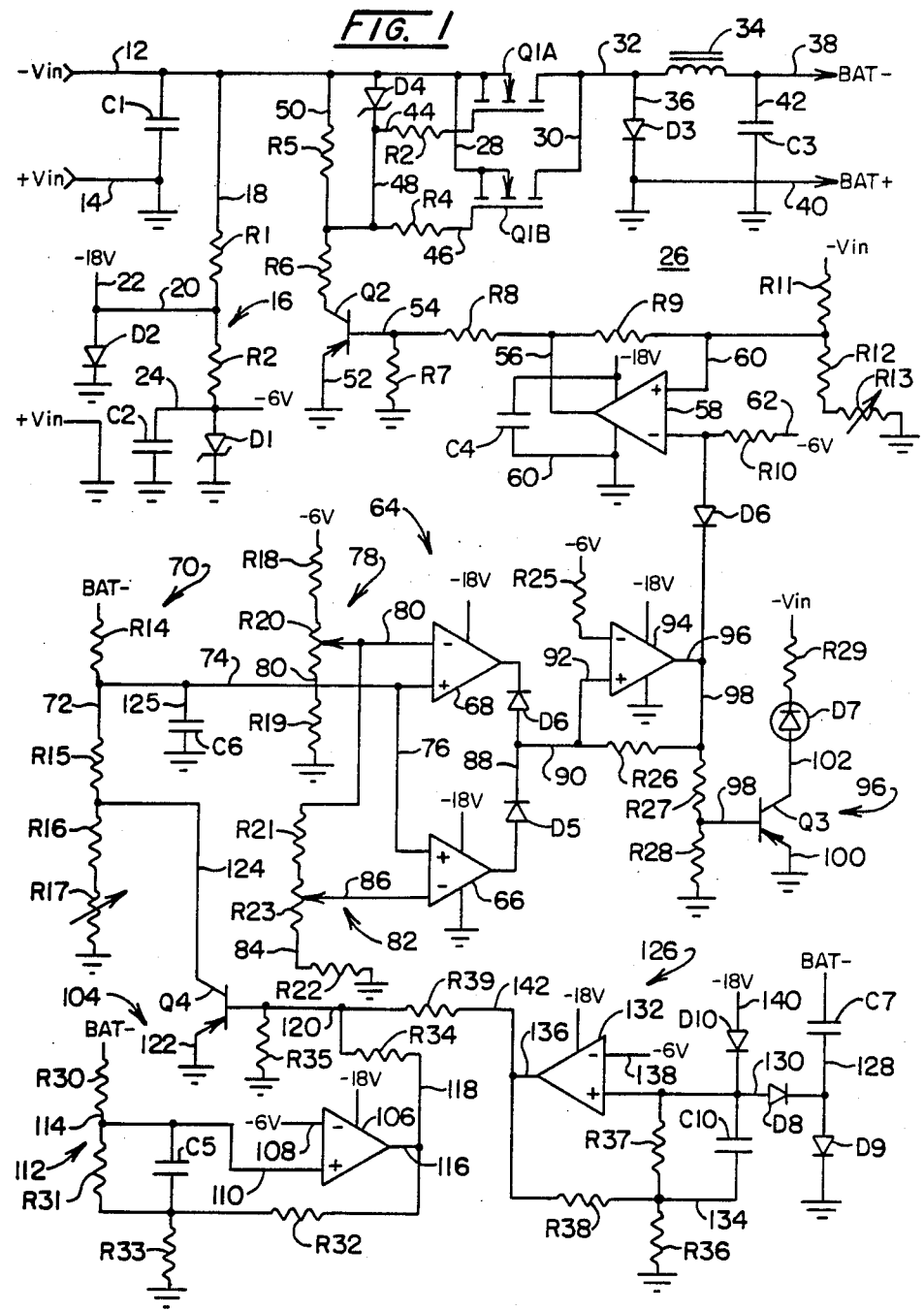
FIG. 1 is a detailed electrical schematic diagram of a preferred embodiment for a battery charger according to the invention.

Referring to FIG. 1, a battery recharging circuit is revealed which may be employed with a solar panel assembly of the typical variety exhibiting a constant current output but load dependent voltages. The circuit employs a highly desirable non-destructive charge process for the batteries wherein a charge is applied of sufficient magnitude and duration to bring the batteries essentially to a level wherein the electrolyte reaches an incipient boil condition or incipient gassing potential. The charge then is removed and again is applied at such time as the batteries reach a predetermined chargeable condition which amounts essentially to the battery rest or float value of charge. This repetitive technique permits a migration of the electrolyte components in the battery both at charge and discharge in a manner improving the electrochemical barrier at each of the plates. As a consequence, the quality of charge achieved at the battery is much improved over conventional trickle charging approaches and, importantly, there is a substantial diminution in the development of hydrogen and oxygen gases conventionally encountered in conjunction with conventional trickle charging approaches.

Because the circuit has applicability to remote field utilization, it further is capable of charging batteries nominally rated at either 12 or 24 volts without any switching or wiring adjustments. Thus, the user in the field is not required to decipher instructions or the like in bringing a battery to a charged condition. Further, the circuit is capable of making a distinguishment between, for example, 12 volt and 24 volt nominally rated batteries even though they are being charged from an essentially fully discharged condition.

The circuit, shown in general at 10, is connectable to the output of, for example, a solar panel assemblage rated at 32 volts at respective negative and positive input terminals 12 and 14 as are labeled $-v_{in}$ and $+v_{in}$. A capacitor C1 is coupled between terminals 12 and 14 to filter input ripple as may be developed from load switching. Negative input line or terminal 12 is coupled with a circuit power supply network represented generally at 16 through line 18. Line 18, in turn, incorporates resistors R1 and R2 and a Zener diode D1 and is coupled to ground or $+v_{in}$. A first, $-18$ v power supply is provided by lines 20 and 22, the latter incorporating Zener diode D2 coupled between line 20 and ground. A second, $-6$ v power supply is provided at line 24 which is coupled between resistor R2 and Zener diode D1 and ground and is seen to incorporate filtering capacitor C3.

The solar panel input is further directed to a step-down switching regulator represented generally at 26. Functioning to maintain peak voltage levels exhibited by the solar panel while generating enhanced current values in accordance with load requirements, the circuit employs parallel coupled solid-state switches Q1A and Q1B which may, for example, be provided as type 1RF511 field effect transistors (FET). Such dual switching devices provide for lower impedance to current flow. The source of transistor Q1A is coupled to negative input via line 12, while the corresponding source of transistor Q1B is coupled to line 12 via line 28. In similar fashion, the drain terminal of transistor Q1B is joined by line 30 with the corresponding drain of transistor Q1A at line 32 such that the switched outputs thereof are directed to an inductor provided as a choke 34. A free-wheeling diode D3 is coupled about inductor 34 by line 36 and the regulator is seen to provide a charging output at lines 38 and 40 which is filtered by capacitor C3 within line 42. This output is connectable with the battery to be charged by terminals 38 and 40 labelled, respectively, "BAT—" and "BAT+".

Transistor Q1A and Q1B are simultaneously gated from respective lines 44 and 46, each incorporating a resistor as at R3 and R4. Gating voltage is controlled or protected by a Zener diode D4 coupled within line 48 and gate control to the network 26 is provided from a switch control arrangement including PNP transistor Q2, the collector of which is connected with source input line 12 through line 50 incorporating divider resistors R5 and R6. Line 46, providing gating control, is shown coupled to line 50 intermediate the latter resistors. The emitter of transistor Q2 is coupled via line 52 to ground, and thus to $-v_{in}$ and the base thereof is coupled to line 54 which is coupled through pull-up resistor R7 to ground, as well as through resistor R8 to the output line 56 of an operational amplifier 58 having a feedback path including line 60, line 54, and resistor R9. Thus, the device 58 functions in the manner of a Schmitt trigger. Device 58 is coupled with $-18$ v power supply which is provided additional filtering by a capacitor C4 coupled within line 60. Triggering performance for the device 58 is provided by a $-6$ v reference applied via line 62 and incorporating resistor R10 and asserted at its negative terminal. Additionally, the positive input thereof is shown coupled to line 60 which, in turn, is coupled to the feedback path at line 54. Line 54 additionally is seen to be coupled to a source monitoring network coupled between $-v_{in}$ and ground ($+v_{in}$) and incorporating divider resistors R11 and R12 as well as variable resistance R13. Thus the trigger circuit will be seen to respond to the source or solar panel voltage at the input to the circuit so as to maintain peak power performance.

With the arrangement shown, with the connection of a storage battery to be charged across output terminals 38 and 40, the triggering function including device 58 is enabled and commences to compare the input voltage or source level signal at line 60 with reference at line 62. As transistor Q2 is drawn into conduction from the triggering function at 58, switches Q1A and Q1B are gated on to energize the inductive component 34 and commence applying current to the coupled battery at terminals 38 and 40. However, as source voltage at input terminals 12 and 14 commences to diminish, the transistor Q2 is turned off. However, current inductively stored at device 34 continues to effect charging of the coupled battery through terminals 38 and 40 by virtue of the presence of free-wheeling diode D3. Thus, the current input in the charging operation is enhanced as the voltage of the solar panel source asserted at terminals 12 and 14 is maintained at a peak power producing level. In the ensuing charging activity, the voltage of the output of the charging arrangement at terminals 38 and 40 tends to follow the instantaneous voltage values at the storage battery being charged. However, the charging efficiency of the arrangement is substantially enhanced with respect to the utilization of power available from the solar panel source.

The earlier-described pulse charging technique is carried out by a pulse charging network represented generally at 64. Network 64 includes two operational amplifier stages 66 and 68 which perform respectively within charge start and charge stop networks as comparators in conjunction with the instantaneous charge voltage levels or charge state condition of the batteries coupled to terminals 38 and 40. Operational amplifiers 66 and 68 may be provided, for example, as type LM324. Such monitoring of battery levels is carried out in conjunction with a divider network 70 including line 72 coupled between terminals 38 and 40 and incorporating divider resistors R14 and R15 for purposes of monitoring batteries of one rated voltage, for example 24 volts nominal. Additional, resistor R16 and divider resistor R17, which combine with resistor R14 and R15, provide an appropriate voltage attenuation or set condition suited for the monitoring of batteries having a lower nominal rating, for example 12 volts. Line 72 is tapped by line 74 which is directed to the positive input of comparator stage 68 as well as to the corresponding input terminal of comparator stage 66 via line 76. Stage 68 functions to respond to the battery under charge reaching a voltage level corresponding with an incipient gassing or boiling point of its electrolyte. The reference point for establishing this level is provided by the resistor network 78 including line 80 coupled between $+6$ v reference and ground and including resistors R18 and R19 as well as variable resistor R20. The wiper of resistor R20 is coupled via line 80 to the negative input terminal of stage 68.

By comparison, comparator stage 66 functions to develop a charge start logic output which is selected to commence when the instantaneous charge state of the battery under charge is at or below its float or predetermined charge level. The reference level for this charge start is provided by resistor network 82 which includes line 84 coupled between line 80 and ground along with resistors R21 and R22 as well as divider resistor R23. The wiper component of resistor R23 is coupled via line 86 to the negative input of comparator stage 66. Each of the comparators 66 and 68 is coupled with −18 v supply and provides an output at line 88 which incorporates diodes D5 and D6. Line 88 is tapped by line 90 which, in turn, is coupled via line 92 to the positive input of an operational amplifier 94. Provided, for example, as a type LF353, the negative input terminal of amplifier 94 is coupled through resistor R25 to −6 v reference, while the output thereof at line 96 is coupled to line 98. Line 98, in turn, is coupled to line 90 which is seen to incorporate a feedback resistor R26. With the feedback arrangement shown, the amplifier 94 functions as a bistable device such that its output at line 96 is at a negative level, for example −16 v when comparator stage 68 detects a fully charged condition. On the other hand, the output at line 96 reverts to a zero voltage level upon the detection of a charge stating condition at comparator 66. The resultant signals at line 98 are shown directed through diode D6 to line 62. The noted signal levels at line 98 derive from the bistable performance of amplifier 94 enables or disables the triggering function 58 in accordance with charge logic.

A visual indication of the charge state of the circuit is provided by the perceptive output of a network 96. In this regard, the charge status signal at line 98 is divided by resistors R27 and R28, the junction of which is tapped by line 98 leading, in turn, to the base of PNP transistor Q3. The emitter of transistor Q3 is coupled via line 100 to ground or +$v_{in}$, while the collector thereof is coupled via line 102 to −$v_{in}$ through a light emitting diode (LED) D7 and resistor R29. Thus, during those intervals wherein the battery is under charge, as determined from comparator stage 66, the LED D7 is energized, while it is de-energized during those periods when full charge has been reached.

The automatic determination of the nominal voltage rating of the battery under charge at terminals 38 and 40 is determined principally by a threshold selection network represented generally at 104. Network 104 includes a comparator stage 106 the negative input terminal of which is coupled via line 108 to −6 v reference and the positive input of which is coupled via line 110 to a battery voltage monitoring network 112. Network 112 essentially is coupled between terminals 38 and 40 of the charging output of the apparatus and is comprised of a line 114 incorporating divider resistors R30 and R31. Line 114 is seen to further incorporate a resistor R32 extending in feedback fashion to the output of the comparator 106 at line 116. Line 114 further is shown coupled to ground through resistor R33 and a capacitor C5 is incorporated between lines 110 and 114 for filtering purposes. The instantaneous charge state of the battery under charge is detected by the network 112 such that a determination can be made, for batteries under adequate charge, as to whether a lower nominal voltage rating is at hand, for example 12 volts or a higher one, for example 24 volts. This evaluation is made by considering the thresholds which may be achieved by the batteries in the course of their being charged up from lower charge values. In this regard, it has been determined for example, that a 12 volt battery will not charge higher than about 16 volts. Thus, by employing, for example, an 18 volt battery charge level or status as a threshold defining a higher rating, a determination can be made as to whether a 12 volt battery or a 24 volt battery is connected in charging relationship with the circuit. In the event that the higher rated or 24 volt battery is in place and the noted selected threshold of 18 volts has been achieved, then the output of the comparator 106 at line 116 reverts to the −18 v supply voltage which level is witnessed at line 118 extending through resistor R34 to line 120. Line 120 is shown coupled through resistor R35 to ground and extends to the base of a PNP transistor Q4. The emitter of transistor Q4 is coupled to ground via line 122, while the collector thereof is coupled by line 124 to line 72 intermediate earlier-described resistors R15 and R16. Thus, with the assertion of the 24 volt battery present mode signal at the base of transistor Q4, conduction ensues and, in effect, resistors R16 and R17 are removed from influence on the circuit 70. Thus, the comparator stage 68 performs in conjunction with the charging parameters for a 24 volt battery. On the other hand, where the network 112 does not detect the noted threshold through which the higher voltage rated battery must pass and the lower one cannot, then the output at line 116 of comparator stage 106 is at a zero voltage level, transistor Q4 does not conduct and resistor R16 and R17 participate in the attenuation of the monitored instantaneous battery status level at network 70.

For many applications of the charging circuit, the battery to be charged which is coupled to terminals 38 and 40 will have an instantaneous charge status which may be low or the battery may be in a "dead" state. In general, the loading applied at charging terminals 38 and 40 may have any of a wide variety of values including a condition wherein no load is coupled across these terminals, i.e. they represent an open circuit. It is necessary for the circuit to be able to detect these conditions and accommodate for batteries having instantaneous charge status voltage levels below the threshold detection capabilities of circuit 104, i.e., the network 104 will be incapable of making a valid determination as to their nominal voltage rating.

To detect the open circuit condition at charging terminals 38 and 40, a capacitor C6 in line 125 is coupled between ground and line 74 within network 64. Under no load conditions, this capacitor will be alternately charged and discharged at a select frequency, for example 10 Hz and this frequency signal may be employed to determine whether or not a battery is connected to the circuit as well as a start-up signal. In this regard, a start-up detection network 126 is provided having a line 128 incorporating coupling capacitor C7 and connected between output charging terminals 38 and 40. Line 128 is seen to be coupled to a line 130 leading to the positive input of an operational amplifier 132 which is configured as a Schmitt trigger. Lines 130 and 128 incorporate respective diodes D8 and D9 which function as a rectifier in conjunction with the high frequency signal applied in the condition of no load being coupled across charging terminals 38 and 40. A timing capacitor C10 is shown coupled within line 134 extending from line 130 to output line 136 of amplifier 132, while a resistor R36 is shown coupled between line 134 and ground, and a timing resistor R37 is coupled between line 134 and line 130. A resistor R38 is coupled in feedback fashion from the positive terminal of amplifier 132 to output line 136 to provide the Schmitt trigger configuration and a −6 v reference is applied to the negative input to amplifier 132 via line 138. To provide over-voltage protection, a line 140 incorporating diode D10 is coupled between −18 v supply and line 130.

With the arrangement shown, the noted no-load 10 Hz start-up signal will be rectified by diodes D8 and D9 to effect a charging of capacitor C10. Where no load is coupled across charging terminals 38 and 40, the charge at capacitor C10 will be maintained and the output of the Schmitt trigger at line 136 be applied through a resistor R39 in line 142 to line 120 in an OR logic relationship with the signal otherwise applied from line 118. This signal will be at −18 v supply and thus turn on transistor Q4 to impose a higher battery voltage rating condition or mode at network 70, for example a 24 v operational mode. Upon the attachment of a battery to be charged to charging terminals 38 and 40, the high frequency will diminish such that the timing capacitor C10 will commence to discharge through resistor R37 over a predetermined interval selected, for example between 1 and 3 minutes. Thus, a battery initially coupled to the charging system will receive a full charge representative of the higher rated voltage of 24 v for this limited interval to assure that it has reached a threshold wherein its nominal voltage rating may be determined by network 104. Following the time-out of the timing network comprised of capacitor C10 and resistor R37, then the output at line 136 as transferred to line 142 will revert to a zero level to turn off transistor Q5 unless a determination has been made at network 104 that the higher rated valuation of the battery is at hand.

Figure 2:
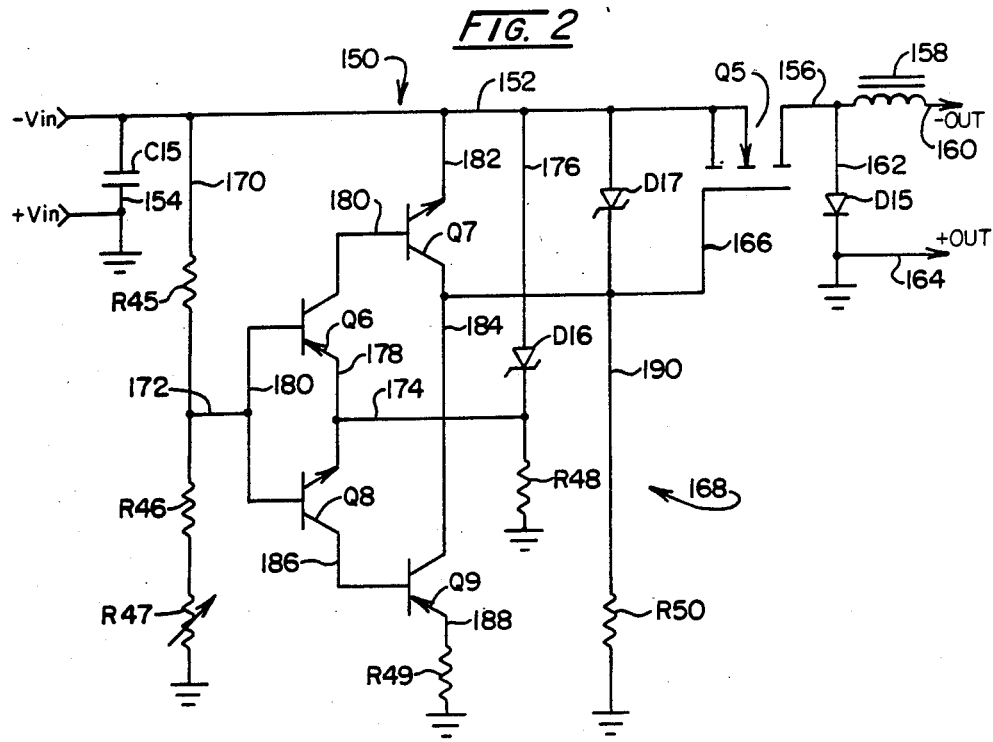
FIG. 2 is a detailed electrical schematic diagram showing a step-down switching booster circuit according to the invention.
Figure 2A:
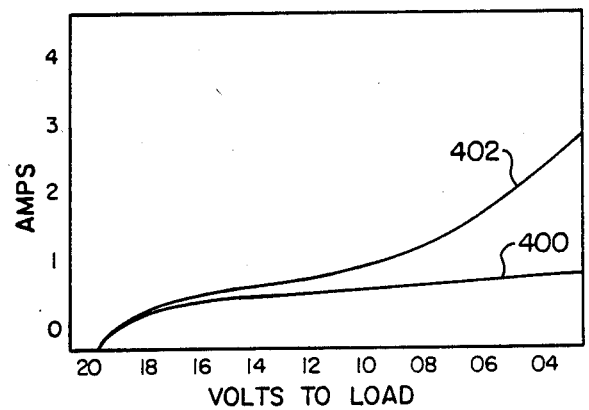
FIG. 2A is a comparison graph showing a normal output of a solar panel exhibiting a constant current characteristic and an output for a panel operating with the improvements of the invention.

Referring to FIG. 2, an adaptation of the current boosting components of the circuit of FIG. 1 is revealed. The power or output enhancement circuit, revealed generally at 150 functions, as before, to maximize the power output from a source such as a solar panel which derives a constant current and exhibits a peak voltage which, under direct loading will drop in consonance with the applied load. The circuit 150 will seek to retain the peak operating voltage point at the solar panel while generating boosted current levels to accommodate load demand. Referring momentarily to FIG. 2A, a performance comparison of the instant circuit with respect to photovoltaic cells is provided as a relationship of amperes to volts to a given load. Without the instant circuit, as represented at curve 400, the panel will produce a substantially constant current output notwithstanding a drop in voltage to the load and, thus, the power available from the panel is diminished with increasing loads. This results in a need for compounding a number of solar panels required to carry out a given powering task. With the instant circuit, however, as load demands increase, current is not constant but elevates notwithstanding a drop in the voltage to the load. Thus, power which otherwise could not be extracted from the panel supplies is now extracted. As an example, a one ampere output solar cell array can be modified with the instant circuit to deliver up to 6 amps of current.

Similar to the earlier circuit, the circuit 150 employs a field effect transistor (FET) Q5 to carry out a switching form of regulation. In this regard, the source terminal of transistor Q5 is coupled via line 152 to the negative input of the source as labeled −v$_{in}$. The positive input from the same source as shown coupled into the circuit at line 154 which is connected to ground as well as to line 152 through capacitor C15. The drain terminal of transistor Q5 is coupled via line 156 to an inductive component or choke 158, the output of which at line 160 provides the negative output for the circuit as labeled "−OUT". A free-wheeling diode, D15, is coupled within line 162 to ground and the latter connection is shown being coupled via line 164 to the output of the circuit labeled "+OUT". By controlling the duty cycle of switching of transistor Q5 via its gate input at line 166, the circuit 150 functions to maintain optimum voltage levels at the source while boosting current levels in accordance with load demand at the outputs 160 and 164. The source responsive control circuit for carrying out this actuation as represented generally at 168 exhibits a desirable simplicity in consequence of its employing that characteristic of an FET as at Q5 which, while exhibiting a very desirable low forward conducting resistance, also exhibits a relatively high gate capacitance. In the latter regard, enhanced current levels are required to charge the gate to carry out rapid switching. This effect is taken advantage of with the circuit 168. In its operation, circuit 168 monitors the source voltage from line 170 which, extending from line 152 incorporates divider resistors R45 and R46 along with a trim resistor R47. Line 170 is tapped at line 172 such that the source monitoring output voltage levels thereat are compared against a reference voltage level at line 174 which is developed from Zener diode D16. Diode D16 is coupled within line 176 extending between line 152 and ground and further incorporating a resistor R48. Line 174, carrying the references voltage is shown extending from line 178 to the emitter of a PNP transistor Q6. The base of transistor Q6 is coupled via line 180 to line 172, while the collector thereof is coupled by line 182 to the base of NPN transistor Q7. The emitter of transistor Q7 is coupled via line 182 to line 152, while the collector thereof at line 184 is connected to the gate control line 166 of transistor Q5.

With the arrangement shown, transistor Q6 is turned on when the base thereof is about 0.6 v more negative than the reference at line 174. As transistor Q6 turns on, transistor Q7 is turned on to draw base current therethrough and very rapidly turn off transistor Q5 by developing a low impedance path from its gate to its source. In conventional fashion, this allows the inductive component 158 to drive a connected load through the free-wheeling diode D15 during the off interval of transistor Q5. Because the input from the source has been unloaded, it will tend to rise and the capacitor C15 will recharge. The voltage then at capacitor C15 as well as at the voltage divider at line 170 elevates toward ground sufficiently to forward bias the base emitter junction of NPN transistor Q8. The base of transistor Q8 is coupled to line 180, while its emitter thereof is coupled via line 186 to the base of PNP transistor Q9. The collector of transistor Q9 is coupled to earlier-described line 184, while the emitter thereof is connected through line 188 and current limiting resistor R49. Thus, as transistor Q8 is turned on, transistor Q9 is drawn into conduction and gating current is directed through line 184 to line 166 to turn transistor Q5 on. Because of the gate capacitance at FET transistor Q5, the charge state of the gate will remain consistent even though transistors Q6 and Q7 have been off. Thus, the device in effect exhibits a memory as to its last state of actuation. Once charged it will tend to remain charged and once discharged it will tend to remain discharged for the purposes of the functioning of circuit 168. Hysteresis separating the off-on performance of transistors Q6 and Q8 is achieved due to the common coupling of their base and emitter electrodes in conjunction with the noted 0.6 v differential.

A Zener diode D17 additionally is provided in the circuit along with current limiting resistor R50 between line 152 and ground and in connection with line 166 to retain the voltage at gate line 166 within acceptable levels below the breakdown rating of transistor Q5. Resistor R6 further functions as a bleeder for permitting relatively slower start-up operation of circuit 150.

Figure 3A:
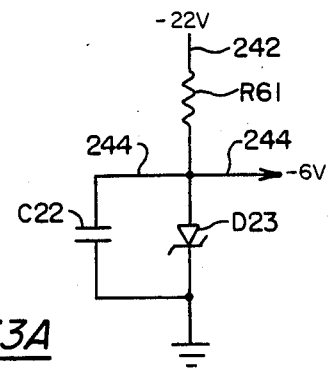
FIG. 3A is an electrical schematic diagram of a power supply used with the circuit of FIG. 3.
Figure 3:
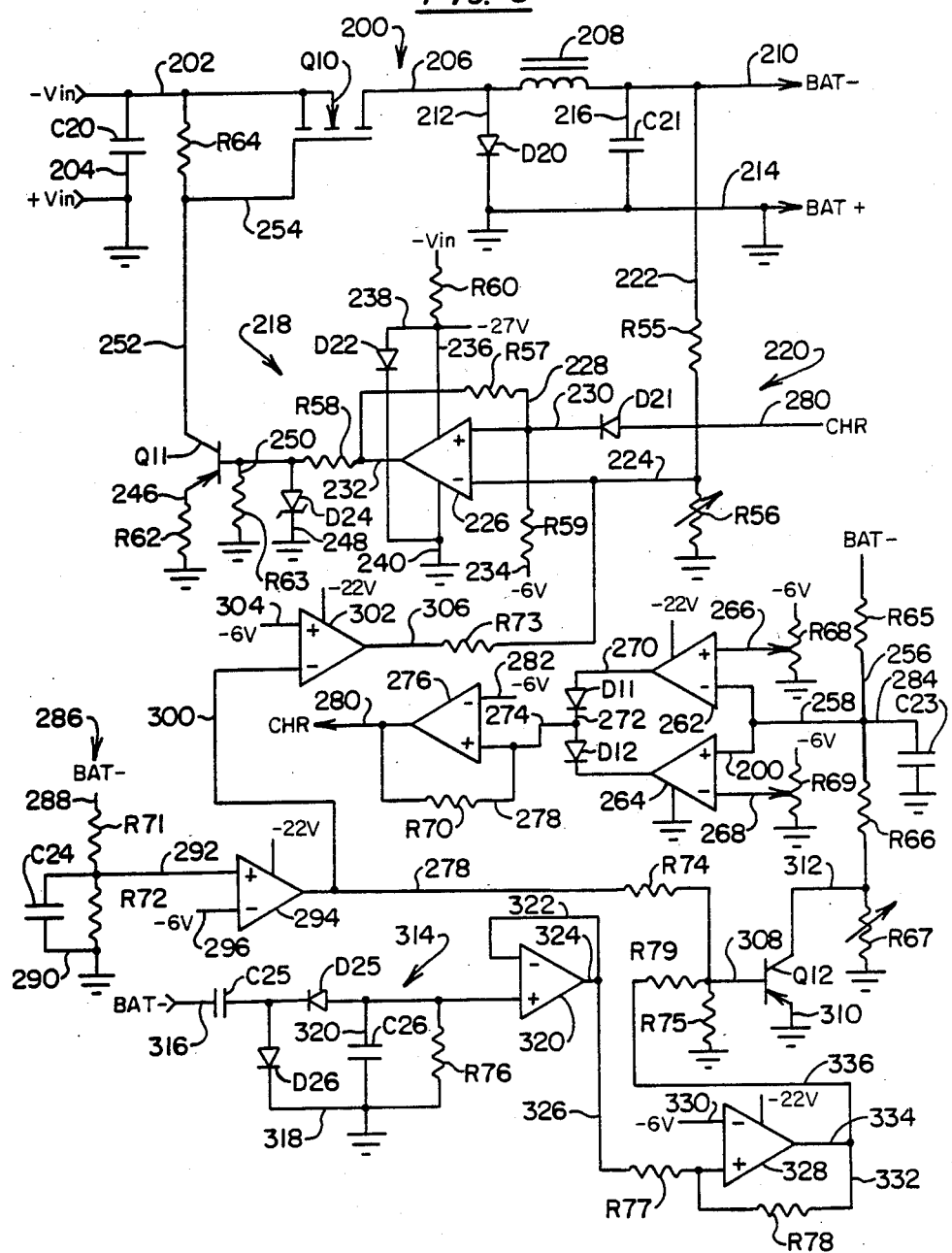
FIG. 3 is a detailed electrical circuit diagram of a battery charger according to another embodiment of the invention.

Referring to FIG. 3, a circuit arrangement is shown which employs a constant current source such as a solar panel cell to carry out charging of a battery using a switching regulator step-down technique. However, this circuit, as represented generally at 200 monitors and controls the voltage which is applied to the battery itself. Similar to the circuit of FIG. 1, circuit 200 carries out a pulse charging method of battery charge and incorporates the earlier-described timing and detection arrangement for determining the nominal rated voltage value of the battery coupled to its output.

Looking to the figure, the circuit is seen to be coupled to the negative side ($-v_{in}$) of the solar panel source at line 202. The corresponding positive input ($+v_{in}$) to the circuit is coupled by line 204 to ground. A filtering capacitor C20 is shown additionally coupled intermediate lines 202 and 204. Line 202 is shown extending to the source terminal of a field effect transistor (FET) 200, the drain terminal of which is coupled via line 206 to the input of an inductive component or choke 208. The output of choke 208 is coupled via line 210 to provide an output for connection with a battery to be charged as labeled "BAT−". A free-wheeling diode D20 is coupled within line 212 between line 206 and ground and functions, as before, to provide current flow to the load or battery being charged during periods when transistor Q10 is in an off state. The coupling of diode D20 to the positive terminal of the battery (BAT+) is shown provided via line 214. A filtering capacitor, C21, is shown coupled by a line 216 between line 210 and ground.

The voltage which is selectively applied to the battery in a charging relationship from line 210 and 214 is monitored and the duty cycle over the switching activity of transistor Q10 are controlled by a charge monitoring circuit represented at 218. Monitoring of the instantaneous battery charge state is provided by a voltage divider circuit 220 within line 222 coupled between line 210 and ground and incorporating resistor R55 and variable resistor R56. These resistors are tapped at their common junction by line 224 extending to the negative input of an operational amplifier 226. Amplifier 226 incorporates a feedback path including line 228 and resistor R57 between line 230 leading to its positive input and at line 232 at its output, the latter line including resistor R58. With the arrangement shown, the amplifier 226 performs as a Schmitt trigger. Line 230 is shown carrying a reference voltage input by virtue of its connection with −6 v reference through line 234 and resistor R59. Line 230 is enabled to thus enable circuit 218 by the assertion of a −6 v charge (CHR) signal thereto at diode D21. A power supply for amplifier 226 as well as other components within the circuit is provided from line 236 incorporating a resistor R60 and coupled to the negative source input from line 202. Line 236 is additionally coupled to line 238 incorporating a Zener diode D22 serving to provide, for example, a −22 v supply voltage. Line 238 extends to line 240 and ground. Looking additionally to FIG. 3A, the −22 v source so developed again is treated by a sub-circuit including line 242, current limiting resistor R61, and Zener diode D23, the cathode side thereof being coupled to ground. A capacitor C22 within line 244 is coupled about diode D23 for filtering purposes. With the arrangement shown, a logic power supply is provided as at line 246 to develop a −6 v reference employed by circuit 200.

Returning to FIG. 3, output line 232 extends through base resistor R58 to the base of PNP transistor Q11. The emitter of transistor Q11 is coupled through line 246 and resistor R62 to ground as a part of a constant current configuration. This configuration further is developed by the presence of a Zener diode D24 within line 248 extending to ground from line 232. A resistor R63 within line 250 assures the turn-off performance of transistor Q11. The collector of transistor Q11 is coupled via line 252 and line 254 to the gate of FET transistor Q10, line 252 further incorporating resistor R64 extending between the gate and source of that transistor.

As thus configured, circuit 218 functions to actuate the switch Q10 to provide a duty cycle with current enhancement but under control based upon a desired charging voltage level for the battery coupled at terminals 210 and 214. Without more, based upon the setting of resistor R56 of the circuit, that voltage level will be targeted for a battery having a lower nominal rating, i.e. 12 volts.

As in the embodiment of FIG. 1, the circuit 200 is operated in a pulse charge manner such that charge commences essentially at the float or a predetermined voltage value for the battery and that charge continues up to the point of incipient electrolyte gassing or boil whereupon the charging is removed until the float value again is reached. Battery voltage is monitored, for example from lines 210 and 214, as represented by line 256 containing divider resistors R65, R66 and variable resistor R67. Line 256 is tapped intermediate resistors R65 and R66 by line 258 which extends via line 260 to the respective negative and positive input terminals of operational amplifiers 262 and 264. These amplifiers perform as comparators, the corresponding positive input terminal of amplifier 262 being coupled via line 266 to the wiper of variable resistor R68 which, in turn, is coupled between −6 v reference and ground. Similarly, the negative input terminal of amplifier 264 is coupled by line 268 to the wiper of variable resistor R69 which is coupled between −6 v reference and ground. Resistor R69 is adjusted to provide a threshold or set point for commencing charging below and at the noted float level of the battery being charged. Conversely, resistor R68 is adjusted such that charging is stopped as the battery electrolyte reaches incipient boil or gassing state, the value or voltage with respect to such states being detected from line 260. In operation, as the instantaneous battery voltage approaches or reaches incipient boil levels, the output at line 270 of comparator stage 262 approaches ground. This output is directed through gating diode D11 which, in turn, communicates via lines 272 and 274 to the positive input of another operational amplifier 276. Amplifier 276 incorporates a feedback line 278 incorporating resistor R70 between its input 274 and output line 280. The opposite input to amplifier 276 at line 282 carries a −6 v reference and with this configuration, a form of bistable device is evolved. Accordingly, for a stop condition, line 280 will swing to a zero voltage condition. On the other hand, where the battery voltage is below or near its float voltage, then the output of comparator stage 264 approaches supply which is reflected at gating diode D12 to alter the state of the bistable stage incorporating amplifier 276. Accordingly, its output at line 280 swings to a −6 v value to enable circuit 218, line 280 being seen coupled to the anode side of diode D21.

To provide an indication that no battery is coupled between charging terminals 210 and 214, as before, a capacitor C23 is coupled within line 284 between ground and line 256. Thus, for that condition, the output at line 280 will oscillate between enabling and disabling conditions at a predetermined frequency, for example selected as 10 Hz.

Circuit 200 includes a threshold selection network wherein, as before, the nominal battery voltage rating can be determined as between two values by evaluating the highest threshold which the lower rated battery can achieve. For a 12 v battery, this value has been found empirically to be about 16 volts. Thus, to provide a system which automatically accommodates to batteries having nominal ratings of either 24 and 12 volts, the circuit 286 monitors the instantaneous charge state of the batteries by a voltage divider circuit including resistors R71 and R72 within line 288 which, in turn, is coupled between the negative terminal and ground or between charging lines 210 and 214. A filtering capacitor C24 within line 290 accommodates for transients and the like. The common junction between resistors R71 and R72 is tapped by a line 292 extending to the positive input of an operational amplifier 294 which performs as a comparator. In the latter regard, a −6 v reference is applied to the opposite terminal thereof via line 296. Accordingly, the output of amplifier 294 at line 298 will be at zero voltage under conditions wherein such 16 v threshold or the like is not reached, thus indicating that charging is to take place under a 12 v nominal rated voltage mode. On the other hand, when the 16 v threshold is reached, then the output at line 298 approaches supply or about −20 v. This output is directed via line 300 to the negative terminal of an operational amplifier stage 302, the opposite input thereto at 304 being supplied with −6 v reference. Amplifier 302 performs as an inverter such that the imposition of a −20 v signal at line 300, its output at line 306, now representing a 12 v battery charging mode, will swing to, for example −20 v or supply. Line 306 incorporates a resistor R73 and is coupled to input line 224 of Schmitt trigger stage 226. Accordingly, at such time as a 24 v mode condition is detected a circuit 286 and an ensuing −20 v signal is developed at lines 298 and 300, line 306 will invert to reflect a zero volt condition thus placing resistor R73 in parallel with resistor R56. It may be recalled that the latter resistor is selected to provide for 12 v nominal rated battery charging. By the addition of this second resistor R73 in parallel therewith, the system adjusts to a higher rated battery voltage, for example 24 v nominal. The same information developed from network 286 is directed along the line 298 to base resistor R74 and line 308 to the base of PNP transistor Q12. The emitter of transistor Q12 is coupled via line 310 to ground, while the collector thereof is coupled by line 312 to line 256 above variable resistor R67. Accordingly, when a 12 v charging mode is present, line 298 is at zero volts and transistor Q12 is off. This permits the assertion of resistance from resistor R67 to evolve a 12 volt mode performance of the pulse charging function. On the other hand, when the voltage at line 298 swings toward −20 v or supply, a 24 volt nominal charging mode is at hand, transistor Q12 is drawn into conduction to essentially shunt resistor R67 from the divider circuit incorporating resistors R65 and R66. The system then pulse charges in accordance with the 24 v mode of operation. Thus, with the instant circuit, both the pulse charging circuit and the switching regulator circuit 218 are adjusted with respect to nominal battery voltage.

As discussed above, for many instances, the battery voltage prior to charging will be low to a level that circuit 286 will be unable to detect its nominal rated voltage value. Thus, as before, for a predetermined interval for example from one to three minutes, the system will assume that all batteries being charged are at the higher nominal rating or 24 v. This logic is provided by a start-up charge network represented generally at 314 which, at the commencement of any charging procedure before a battery has been connected to terminals 210 and 214, will receive the earlier-discussed 10 Hz oscillation start-up signal from along line 316 which corresponds to the negative battery charging terminal 210. The signal is applied through coupling capacitor C25 to a rectifier function comprised of diodes D25 and D26, the latter diode being positioned within line 318. Under the high frequency initial condition of no load, there results a charging of timing capacitor C26 positioned within line 320. Line 320 may be seen to extend between line 316 and 318, the latter being coupled to ground. However, where the typically encountered charging pulses are present, persisting for extended intervals, capacitor C26 is discharged through resistor R76. Line 316 is seen directed to the input of an operational amplifier 320, which, incorporating feedback line 322 from its output line 324 provides a comparator function. Accordingly, when the output at line 324 is less than 6 v, a 12 v mode charging is considered to be present, wherein if the value thereof is above −6 v reference, then a 24 v mode charging is present. These mode signals are transmitted via line 326 to the positive input of an operational amplifier 328 through a resistor R77. The opposite input to amplifier 328 is provided with −6 v reference at line 330 and the amplifier incorporates a feedback path including line 332 and R78 extending from line 326 to its output at line 334. Accordingly, the amplifier 328 is configured in the nature of a Schmitt trigger and provides a sharp demarkation for a charging mode change. The resultant output at line 336 is directed through resistor R79 to line 308 in OR logic fashion such that for the noted start-up interval, a 24 v mode condition is impressed upon transistor Q12 turning it on. A resistor R75 additionally is coupled to line 308 to provide enhanced turn-off of the transistor Q12. Following a charging of the battery at the 24 v mode for the limited start-up interval, a threshold charging voltage should be reached which is evaluated by network 286. In the event the threshold is above that selected for the higher rated battery or, for example 24 v, then transistor Q12 remains in an on condition. Where the threshold is not reached so as to indicate the lower rated battery or 12 v battery, then the condition at line 308 is such as to turn transistor Q12 off and bring resistor R23 into influence in conjunction with the divider network including resistors R65 and R66.

Figure 4A:
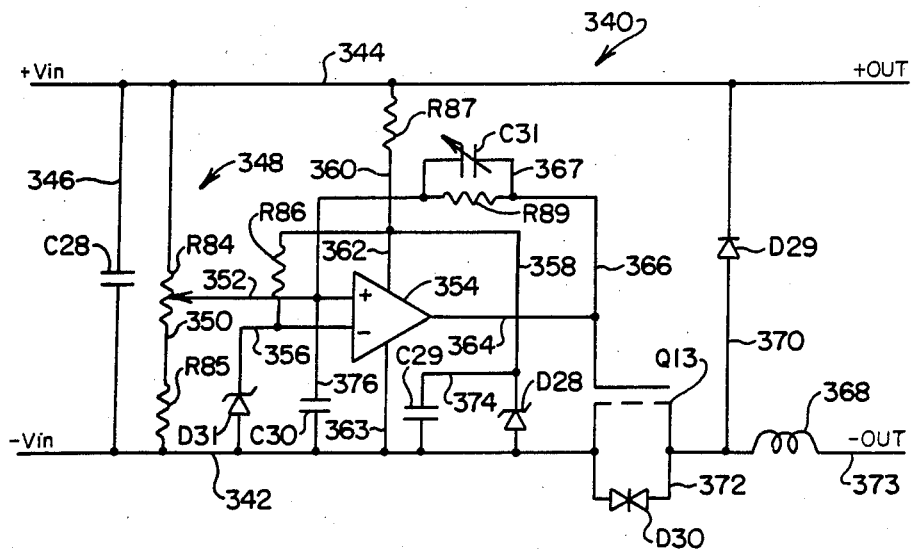
FIG. 4A is a detailed electrical schematic diagram showing another embodiment of the current booster circuit according to the invention.

Referring to FIG. 4A, an adaptation of the current boosting circuit of FIG. 2 is revealed at 340. The circuit is structured to improve output from a solar panel source of power which derives constant current and exhibits a peak voltage, which, under direct loading will drop. A coupling to the solar panel or energy source for the circuit 340 is shown as labelled $+V_{in}$ and $-V_{in}$ at respective lines 342 and 344. Line 346 is seen coupled between lines 342 and 344 for carrying storage capacitor C28 which functions to charge in accordance with the current developed by the source or solar panel. As capacitor C28 thus is charged, a voltage divider network 348 comprised of a potentiometer R84 and resistor R85 within line 350 extending between lines 342 and 344 develops a corresponding but suitably attenuated charge level signal for voltage which is witnessed at line 352 extending from the wiper arm or the like of potentiometer R84. This potentiometer R84 will be seen to provide the adjustment for developing operation at the noted peak point of power for the solar panel being employed. The charge level response signal or voltage at line 352 is seen to be directed to the non-inverting input of an operational amplifier 354. Provided, for example, as a type LF351, the inverting input to amplifier 354 receives a reference voltage level from line 356 which is developed from a Zener diode D28 within line 358, resistor R87 coupled between line 358 and line 344, resistor R86 and a Zener diode D31. Diode D28 and resistor R87 further provide a stable voltage source to the amplifier 354 via line 362. The amplifier is coupled to a negative source via line 363 extending to line 342. Capacitor C29 within line 374 is seen to be coupled in parallel with Zener diode D28. This capacitor functions as a power supply filter for purposes for stabilizing the power source to the amplification stage 354 via line 362.

The output of amplifier 354 extends via lines 364 and 366 to the gate of FET transistor Q13. The source and drain terminals of transistor Q13 are coupled between lines 342 and 373 and a Zener diode D30 is coupled within line 372 across these source and drain terminals to provide protection from spikes or the like which may be occasioned with the operation of an inductor 368 coupled within output line 373. For example, the device may function to clip voltages above, for example, 50 volts. A free-wheeling diode D29 is shown coupled between lines 342 and 373 via line 370.

In operation, as the voltage increases at line 352 due to the charging of capacitor C28, the reference voltage value at line 356 will be exceeded and the output of the amplifier stage 354 at line 364 will develop a high or a positive going voltage which is witnessed at lines 364 and 366 and functions to gate or actuate FET transistor Q13 to an on condition to effect conduction between its source and drain terminals. As a consequence, inductor 368 in line 373 will be charged or excited and, as this occurs, the corresponding voltage build-up at storage capacitor C28 will diminish. As this stored energy from capacitor C28 diminishes, the voltage level at line 352 drops below reference at line 356 in dependence upon the hysteresis characteristics evolved in conjunction with the amplifier 354. Accordingly, the output of amplification stage 354 at lines 364 and 366 reverts to a low value to turn off the transistor Q13. As a consequence, the inductor 368 discharges to charge the load through free-wheeling diode D29. As this occurs, storage capacitor C28 commences to charge to repeat the cycling.

A capacitor C30 in line 376 coupled between lines 352 and 342 functions to develop some of the noted hysteresis in the operation of amplifications stage 354. It is necessary to assure that it is not operated at too high a switching frequency and that the switching is assured to be at power supply level, for example, 18 v on and 0 v off. Thus, switching assurance is developed with this capacitor coupled in conjunction with the non-inverting input of the amplification stage. In effect, the capacitor C30 develops a self-limiting function for the stage 354 and will be seen to function in a voltage divider sense as the device 340 operates in high current demand situations.

It may be observed that line 366 forms a feedback arrangement in conjunction with resistor R89 and a variable capacitor C31 coupled across the latter resistor by line 367. This capacitor is adjustable for conforming the circuit to finer variations in the performance of the components thereof, for example amplifier 354 and capacitor C28. When considered in conjunction with capacitor C30, the device forms a form of capacitive current voltage divider circuit within the feedback network of amplifier 354. As the current demands of the load increase, a form of dynamic feedback is achieved with this capacitive arrangement to achieve a sharper hysteresis characteristic necessary to avoid unduly high hysteresis excursions at high frequency switching. This permits the circuit 340 to operate close to the peak operating point of the solar panel during high current demand.

Figure 4B:
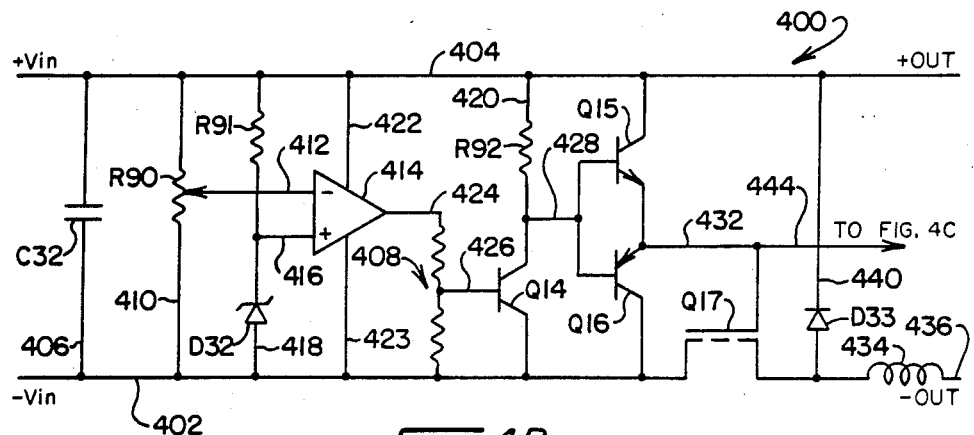
FIG. 4B is a detailed electrical schematic diagram showing a current booster circuit according to the invention.

Referring to FIG. 4B, a preferred adaptation of the current boosting circuit of FIGS. 2 and 4A is revealed. This circuit, as revealed generally at 400, also functions to maximize the power output from a source such as a solar panel which derives a constant current and exhibits a peak voltage which, under direct loading, will drop in consonance with the applied load. The circuit 400 will seek to retain the peak operating voltage point at the solar panel while generating boosting current levels to accommodate load demands. Coupling to the solar panel or energy source is provided at lines 402 and 404.

Figure 5:
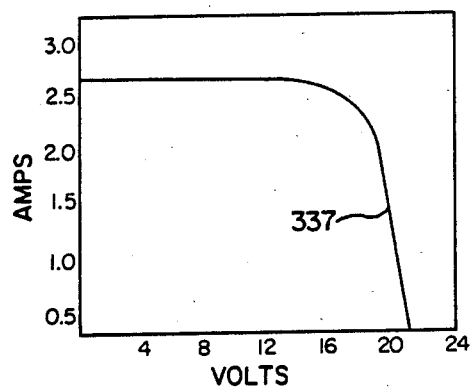
FIG. 5 is a characteristic curve of volts versus amperes for the output of a typical solar panel.
Figure 6:
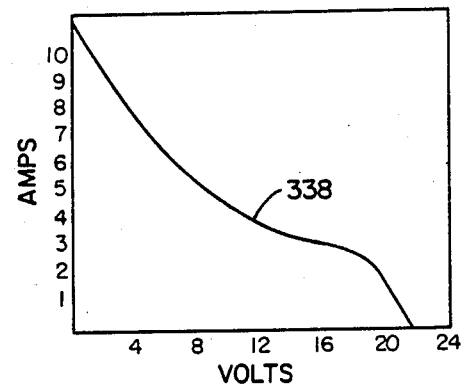
FIG. 6 is a representative output curve charting volts versus amps for the output of an enhancement circuit to the invention.
Figure 7:
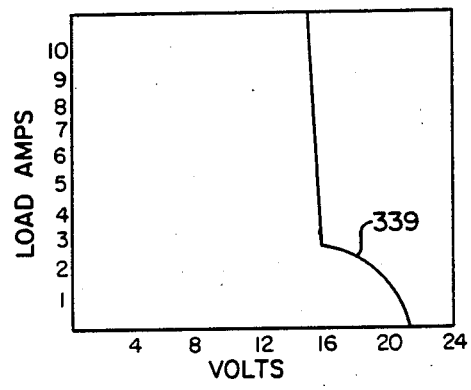
FIG. 7 is a characteristic curve for a solar panel operating in conjunction with an enhancement circuit of the invention comparing the volt output characteristic of the panel with corresponding current demand of an exemplary load.

Looking additionally to FIG. 5, a typical charting of current versus voltage for a photovoltaic or solar panel is revealed as a curve 337. Should the load on the output of a solar panel be increased to the extent that the current demand of the load increases, there will exist at the initial higher voltage levels an increase in current with corresponding decrease in voltage until the rate of current increase lessens even though load resistance decreases. Such a decrease in the current rate of change is seen in FIG. 5 to commence at about 18 volts. At about 14 volts on this typical curve, the rate of change is decayed to the point that further reductions of load resistance will cause essentially no increase in current. By considering the power output of a solar panel represented in FIG. 5, the device will deliver 2.5 amps at 14 volts to provide a power output of 35 watts, but that power output will decrease due to the limitation of current change as the load increases. Thus, as the load requires more power the panel responds by supplying less power. By employing the circuit of the instant invention as represented at FIGS. 4A and 4B, the output of that circuit when coupled with the output of a photovoltaic panel or solar panel assumes the characteristic represented at curve 338 in FIG. 6. Here, as load demands increase, resultant current generation is enhanced to avoid the current limitation of direct coupling to a solar panel. The output of the solar panel itself is shown in FIG. 7 at curve 339. Here, the solar panel is held loaded to the point where the product of voltage and current is at a maximum power value and the solar panel is considered to be operating at its maximum power point. When the panel is held at this maximum power point, the load will receive maximum current and thus maximum power transfer. Accordingly, it is desirable that the circuit of FIGS. 4A and 4B be adjustable to a peak point of power for the solar panel.

Returning to FIG. 4B, a coupling to the solar panel or energy source for the circuit 400 is shown as labelled +$V_{in}$ and −$V_{in}$ at respective lines 402 and 404. Line 406 is seen coupled between lines 402 and 404 for carrying storage capacitor C32 which functions to charge in accordance with the current developed by the source or solar panel. As capacitor C32 thus is charged, potentiometer R90 within line 410 extending between lines 402 and 404 develops a corresponding but suitably attenuated charge level signal for voltage which is witnessed at line 412 extending from the wiper arm or tap of potentiometer R90. This potentiometer R90 will be seen to provide the adjustment for developing operation at the noted peak point of power for the solar panel being employed. The charge level response signal or voltage at line 412 is seen to be directed to the inverting input of an operational amplifier 414. Provided, for example, as a type LF351, the non-inverting input to amplifier 414 receives a reference voltage level from line 416 which is developed from a Zener diode D32 within line 418, resistor R91 within line 418 coupled between line 402 and line 404. The reference voltage is thus equivalent to the Zener voltage of diode D32 with current limited by resistor R91. The amplifier is coupled to a negative source via line 423 extending to line 402 and to a positive source via line 422 extending to line 404. The output of amplifier 414 extends via line 424 to a voltage divider network 408 which develops a suitable signal for turning NPN transistor Q14 on and off by line 426.

In operation, as the voltage increases at line 412 due to the charging of capacitor C32, the reference voltage value at line 416 will be exceeded and the output of the amplifier stage 414 will develop a logic low or low going voltage which is witnessed at lines 424 and 426 and functions to close transistor Q14 to an off condition. As a consequence, the voltage at the collector of transistor Q14 is positive going, and causes NPN transistor Q15 to turn on and PNP transistor Q16 to turn off through resistor R92 coupled within line 420 and between lines 404 and 428. Transistor Q14 serves the dual function of inverting and enhancing the voltage of the amplifier output along line 424. Transistors Q15 and Q16 are configured as an emitter-follower pair and form a totem pole output which is coupled to MOSFET transistor Q17 by line 432. While transistor Q15 is on, the gate of transistor Q17 will be pulled high by effectively connecting line 432 to line 404. In this regard, the emitter-follower configuration of transistors Q15 and Q16 enhances the current available to the capacitive gate of Q17 and thereby effects quicker, more efficient charging and discharging.

Flooding the gate of MOSFET transistor Q17 effects conduction between its source and drain terminals with the result that inductor 434 in line 436 will be charged or excited and, as this occurs, the corresponding voltage build-up at storage capacitor C32 will diminish. As this stored energy from capacitor C32 diminishes, the voltage level at line 412 drops below the reference at line 416 and the output of amplification stage 414 at lines 424 and 426 reverts to a high value to turn on transistor Q14. When transistor Q14 turns on, its collector and line 428 are pulled to low voltage, transistor Q15 turns off and transistor Q16 turns on. The emitters of both transistors Q15 and Q16 are thus pulled low, closing the gate of MOSFET Q17. As a consequence, inductor 434 discharges to charge the load through free-wheeling diode D33 within line 440. As this occurs, storage capacitor C32 commences to charge to repeat the cycling.

Figure 4C:
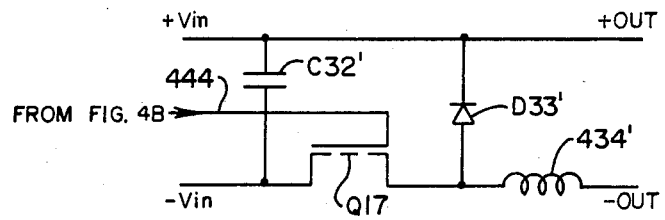
FIG. 4C is an electrical schematic diagram showing a cascadable power stage.

The emitter-follower configuration of transistors Q15 and Q16 permits not only the rapid and efficient charging and discharging of MOSFET transistor Q17, since the gate of transistor Q17 is essentially alternately coupled directly to +$V_{in}$ and −$V_{in}$ without current limiting resistors, but also the stacking or cascading of multiple power output stages which can function on or slave to the switching capacity of one main source responsive unit. FIG. 4C depicts such a supplemental or cascadable power stage which consists merely of an arrangement for carrying out the checking signal developed from the main unit in FIG. 4B along line 444, to the storage capacitor C32', the MOSFET transistor Q17', the inductor 434' and the free-wheeling diode D33'.

In operation, each cascaded power stage functions in identical fashion and simultaneously with the main circuit 400. For optimal results, the main circuit and each cascaded stage can handle 3 amps; so assuming a typical photovoltaic or source input of 16V each output stage will generate about 50 watts of power.

Figure 8A:
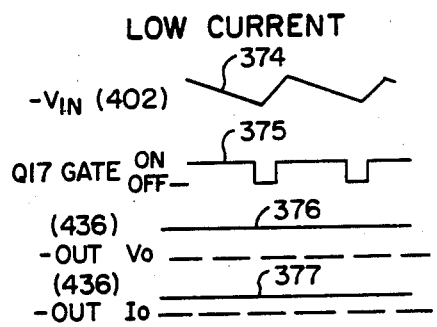
FIGS. 8A and 8B show a sequence of curves for various output lines and components of a solar panel and enhancement circuit of the invention respectively in low current load demands and high current load demands.

Looking additionally to FIG. 8A, the performance of the circuit under lightly loaded or low current demand conditions is schematically portrayed. Such conditions may occur, for example, where a battery having a 12 v nominal rating is being charged by a solar panel having the same rating. The supply panel voltage at the negative rail 402 is represented at curve 374 showing its performance between the upper and lower trip points of the amplifier 414. The corresponding performance of FET gate Q17 is represented aligned with curve 374 at curve 375. Note the conducting interval for transistor Q17. The corresponding output voltage at line 436 for the circuit 400 then is represented schematically at the d.c. level 376 and the corresponding output current is represented by the level 377. In effect, the circuit for these lower current demands maintains panel voltage oscillating slightly above and slightly below the peak power point. Inasmuch as the load voltage is lower than panel voltage, the current increases although not dramatically in the instant example.

Figure 8B:
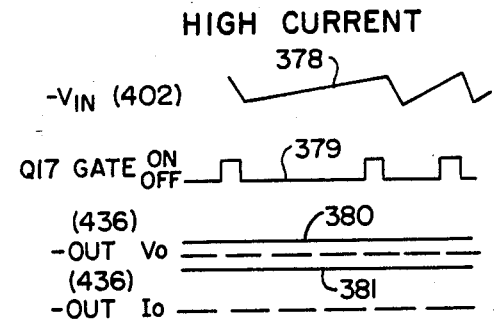

Looking to FIG. 8B, exemplary corresponding output for the operation of circuit 400 at high current demand, i.e. heavy loading, is revealed. The panel input voltage as at line 402 is represented by curve 378 which shows a shorter conducting interval for transistor Q17. In this regard, realize that while the conducting interval has decreased, the frequency of conducting intervals has increased and so the total charging time approaches that of the low current demand case. This sharp on and off performance of transistor Q17 is represented at curve 379 which is aligned with curve 378. The resultant output voltage at line 436 which will follow the load is seen to diminish a curve 380 with respect to low current demand as represented by corresponding level 376 in FIG. 8A. Further, it may be observed that the current output of circuit 400 at line 436 has considerably increased as represented at curve 381 which may be compared with curve 377 of FIG. 8A.

Referring to FIG. 9, the rear view of a solar panel is revealed which may incorporate the above-described enhancement circuits, particularly as represented in conjunction with FIGS. 4A–C. In general, these panels will be formed as modules, for example about 4' by 1' in rectangular shape or about 3' by 2'. The photovoltaic regions of the panels (not shown) may, for example, be fashioned of thin film amorphous solar cells which are mounted upon a supportive substrate. FIG. 9 shows the back side of this substrate at 382 being supported by a frame, the outer edge of which is shown at 384. To provide further support for the substrate-photovoltaic region, supportive cross members 386 may be molded with the frame outer edge 384. The cross-members extend to a centrally disposed junction box 388 which may be integrally molded therewith and into which terminations of the solar cell array protrude from the front region of the panel. Thus, the junction box 388 receives the panel output and, in turn, has external output terminals which may be seen in FIG. 9A at 390 for connection with a load or in combination with other solar panels. FIG. 9A shows the junction box in closer detail as including an encapsulated output enhancement circuit 392 which receives the panel output as at lines 394 and 396. Where, for example, a circuit as described in conjunction with FIG. 4B is employed at 392, the cost for providing this enhancement is low enough to justify the incorporation of a circuit with each panel. Thus, when an array of panels are assembled through their terminals as at 390, loss of one panel will not generally affect the full performance of the remaining panels of the array, assuming appropriate panel interconnections.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. Apparatus for charging a battery exhibiting variable charge state voltage levels from the output of a solar cell energy source exhibiting variable voltage levels and substantially constant current, comprising:

a step-down circuit including solid-state switch means actuable between conducting and non-conducting states, connectable in switching relationship with said source output, inductor means coupled with said switch means and connectable in charging relationship with said battery for conveying current thereto from said source when said switch means is in said conducting state, and unidirectional conducting means connectable in charging relationship with said battery for conveying current from said inductor means when said switch means is in said non-conducting state;

switch control means responsive substantially only to said source variable voltage levels for actuating said switch means, when enabled from a disabled condition, at switching rates controllably varied to substantially maintain a predetermined high value of said voltage levels exhibited by said source so as to optimize energy transfer to said battery; and charge monitoring means responsive to said battery charge state voltage levels for selectively enabling said switch control means to effect charging of said battery to a fully charged condition.

2. The apparatus of claim 1 in which:

said charge monitoring means includes charge level setting means responsive to said variable charge state voltage levels and having a first set condition selected for effecting a fully charged condition of a said battery having a first nominal voltage rating, and having a second set condition for effecting a fully charged condition of a said battery having a second nominal voltage rating; and including threshold selection network means responsive to said variable charge state voltage levels for deriving said charge monitoring means first set condition when said variable charge state voltage levels are below a predetermined threshold level and for deriving said charge monitoring means second set condition when said variable charge state voltage levels are above said predetermined threshold level.

3. The apparatus of claim 2 including start-up charge network means for deriving said charge monitoring means second set condition for a predetermined interval at the commencement of said battery charging.

4. The apparatus of claim 1 in which said switch control means includes:

source monitoring means responsive to said source variable voltage levels for deriving a source level signal;

reference means for deriving a reference signal of predetermined value; and comparison network means responsive to said source level signal and said reference signal for actuating said switch means into said conducting state when the level of said source signal is above the level of said reference signal, and for actuating said switch means into said nonconducting state when the level of said source level signal is below the level of said reference signal.

5. The apparatus of claim 1 in which said charge monitoring means includes:

level setting means responsive to said variable charge state voltage levels for providing a charge state signal;

charge stop means responsive to said state signal and having a charge stop signal when said charge state signal corresponds with a charge state voltage level representing a fully charged condition of said battery;

charge start means responsive to said charge state signal and having a charge start signal when said charge state signal corresponds with a charge state voltage level below a predetermined voltage level for said battery below said charge state voltage level representing said fully charged condition; and said switch control means is enabled in response to said charge start signal and disabled in response to said charge stop signal.

6. Apparatus for charging a battery exhibiting variable charge state voltage levels from the output of an energy source exhibiting variable voltage levels and substantially constant current, comprising:

a step-down circuit including solid-state switch means actuable between conducting and non-conducting states, connectable in switching relationship with said source output, inductor means coupled with said switch means and connectable in charging relationship with said battery for conveying current thereto from said source when said switch means is in said conducting state, and unidirectional conducting means connectable in charging relationship with said battery for conveying current from said inductor means when said switch means is in said non-conducting state;

switch control means responsive to said source variable voltage levels for actuating said switch means, when enabled in response to a charge start signal from a disabled condition, to substantially maintain a predetermined high value of said voltage levels exhibited by said source, said switch control means being disabled in response to a charge stop signal;

charge monitoring means including:

level setting means responsive to said variable charge state voltage levels for providing a charge state signal;

charge stop means responsive to said charge state signal and having first reference voltage network means for providing a first reference voltage having a value selected to derive a fully charged condition of said battery, and first comparator means responsive to said first reference voltage and to said charge state signal for deriving said charge stop signal; and charge start means responsive to said charge state signal and including second reference voltage network means for providing a second reference voltage having a predetermined value and second comparator means responsive to said second reference voltage and to said charge state signal for deriving said charge start signal when said charge start signal is at or below the level of said second reference voltage.

7. The apparatus of claim 6 in which said level setting means includes capacitor means chargeable in the absence of adequate said charge state voltage levels between voltage levels corresponding with said first and second reference voltages to derive a start-up signal of predetermined frequency.

8. The apparatus of claim 7 in which:

said charge monitoring means includes charge level setting means responsive to said variable charge state voltage levels and having a first set condition selected for effecting a fully charged condition of a said battery having a first nominal voltage rating, and having a second set condition for effecting a fully charged condition of a said battery having a second nominal voltage rating; and including threshold selection network means responsive to said variable charge state voltage levels for deriving said charge monitoring means first set condition when said variable charge state voltage levels are below a predetermined threshold level and for deriving said charge monitoring means second set condition when said variable charge state voltage levels are above said predetermined threshold level.

9. The apparatus of claim 8 including start-up charge network means responsive to said start-up signal for deriving said charge monitoring means second set condition for a predetermined interval at the commencement of said battery charging.

10. An output enhancement circuit for driving a load from an energy source having an output exhibiting variable voltage levels including a peak voltage level and substantially constant current, comprising:

a step-down circuit including solid-state switch means actuable between conducting and non-conducting states connectable with said source output, inductor means connectable intermediate said switch means and said load for conveying current thereto from said source when said switch means is in said conducting state, and unidirectional conducting means connectable with said load for conveying current thereto from said inductor means when said switch means is in said non-conducting state;

source monitoring means responsive to said source variable voltage levels for providing a source monitoring output;

control means responsive to said source monitoring output for actuating said switch means to derive a pulse width modulation of current from said source into said inductor means selected to substantially maintain said source exhibited peak voltage level so as to optimize energy transfer therefrom to said load.

11. The circuit of claim 10 in which:

said solid-state switch means includes a field effect transistor having a gate exhibiting gate capacitance; and said control means comprises gate switching means for alternately charging and discharging said gate capacitance to derive said conducting and non-conducting states.

12. The circuit of claim 10 in which said control means includes reference means for deriving a predetermined reference signal and comparison network means responsive to said source monitoring output and said reference signal for actuating said switch means into said conducting state and alternately into said non-conducting state.

13. The circuit of claim 12 in which said comparison network means includes NPN and PNP transistors, the bases of which are coupled in common to receive said source monitoring output and the emitters of which are coupled in common with said reference signal.

14. An output enhancement circuit for driving a load from an energy source having an output exhibiting variable voltage levels including a peak voltage level and substantially constant current, comprising:

a step-down circuit including solid-state switch means having a field effect transistor with a gate exhibiting gate capacitance, said switch means being actuable between conducting and non-conducting states and connectable with said source output, inductor means connectable intermediate said switch means and said load for conveying current thereto from said source when said switch means is in said conducting state, and unidirectional conducting means connectable with said load for conveying current thereto from said inductor means when said switch means is in said non-conducting state;

source monitoring means responsive to said source variable voltage levels for providing a source monitoring output;

control means responsive to said source monitoring output for actuating said switch means to derive a pulse width modulation of current from said source into said inductor means selected to substantially maintain said source exhibited peak voltage level so as to optimize energy transfer therefrom to said load; and said control means comprising reference means for deriving a predetermined reference signal, and comparison network means responsive to said source monitoring output and said reference signal for alternately charging and discharging said gate capacitance to correspondingly derive said conducting and non-conducting states.

15. The circuit of claim 14 in which said comparison network means includes NPN and PNP transistors, the bases of which are coupled in common to receive said source monitoring output and the emitters of which are coupled in common with said reference signal.

16. Apparatus for charging a battery exhibiting variable charge state voltage levels and which is chargeable at one level of select first and second levels of charge from an energy source, comprising:
- step-down regulator means having a charging output connectable with said battery and including control means responsive to a charge signal, said charging output and to one of first and second threshold conditions for deriving on respective said first and second select levels of charge;
- charge monitoring means responsive to the charge state condition of said battery corresponding with one of third and fourth selected threshold conditions representing a fully charged state of said battery for deriving said charge signal; and
- threshold selecting network means responsive to said variable charge state voltage levels for deriving said first threshold condition and deriving said second and fourth threshold conditions when said charge state voltage level exceeds a predetermined maximum charging level determined with respect to said third threshold condition.

17. The apparatus of claim 16 including start-up charge network means for deriving said charge monitoring means fourth selected threshold for a predetermined interval when said charge state voltage level is below a predetermined value at the commencement of charging by said regulator means.

18. The apparatus of claim 16 in which said step-down regulator means comprises solid-state switch means selectively actuable between conducting and non-conducting states and having an input connectable with said source output, inductor means coupled with said switch means and having a charge output connectable with a said battery for conveying current thereto from said source when said switch means is in said conducting state, and unidirectional conducting means connectable with said battery for conveying current from said inductor means when said switch means is in said non-conducting state, said control means actuating said switch means to derive one of said first and second threshold conditions.

19. The apparatus of claim 16 in which said charge monitoring means comprises:
- level setting means responsive to said variable charge state voltage levels and one of said third and fourth selected threshold conditions for providing a charge state signal;
- charge stop means responsive to said charge state signals and having a charge stop signal when said charge state signal corresponds with a charge state voltage level representing a fully charged condition of said battery;
- charge start means responsive to said charge state signal and having a said charge signal when said charge state signal corresponds with a charge state voltage level below a predetermined voltage level; and
- said control means is responsive to said charge stop signal to terminate said derivation of battery charge.

20. The apparatus of claim 19 in which said charge start means includes:
- first reference voltage network means for providing a first reference voltage having a predetermined value;
- first comparator means responsive to said first reference voltage and to said charge state signal for deriving said charge start signal when said charge state signal is below the level of said first reference voltage;
- second reference voltage network means for providing a second reference voltage having a value selected to derive a fully charged condition of said battery; and
- second comparator means responsive to said second reference voltage and to said charge state signal for deriving said charge stop signal.

21. The apparatus of claim 20 in which said level setting means includes capacitor means chargeable in the absence of said battery between voltage levels corresponding with said first and second reference voltage to derive a start-up signal of predetermined detectable frequency.

22. The apparatus of claim 21 including start-up charge network means for deriving said charge monitoring means fourth selected threshold for a predetermined interval when said charge state voltage level is below a predetermined value at the commencement of charging by said regulator means responsive to said start-up signal.

23. An output enhancement circuit for driving a load from an energy source having an output exhibiting variable voltage levels and having a peak voltage level corresponding with maximum power output, and substantially constant current, comprising:
- energy storage means connectable across said output and chargeable at given rates by said current to variable charge levels;
- solid-state switch means connected in energy transfer relationship with said energy storage means and actuable between conducting and non-conducting states;
- inductor means connected with said solid-state switch means and connectable with said load for conveying current thereto from said source and energy storage means when said solid-state switch means is in said conducting state;
- unidirectional conducting means connectable with said load for conveying current thereto from said inductor means when said solid-state switch means is in said non-conducting state;
- switch control network means having a first input responsive to a charge level responsive signal corresponding with the said charge levels of said energy storage means and a second input responsive to a reference level, and a switching output coupled with said solid-state switch means reference network means for deriving said reference level, said switch control network means being responsive to said charge level responsive signal and to said reference level to actuate said solid state switch means at frequencies varying in correspondence with said given rate of charge of said energy storage means to substantially maintain said source peak voltage level.

24. The circuit of claim 23 in which said switch control network includes:
- operational amplifier means having a said first input responsive to said charge level signal, a said second input responsive to said reference level, and an amplifier output;
- voltage amplification stage means, responsive to said amplifier output of said source for providing a voltage enhanced output; and
- emitter-follower stage means being connectable across said output and with said solid-state switch means and responsive to said voltage enhanced output for enhancing the current values assertable therefrom.

25. An output enhancement circuit for driving a load from an energy source having an output exhibiting variable voltage levels including a peak voltage level and substantially constant current, comprising:

energy storage means connectable across said output and chargeable by said current to variable charge levels;

solid-state switch means connected in energy transfer relationship with said energy storage means and actuable between conducting and non-conducting states;

inductor means connected with said solid-state switch means and connectable with said load for conveying current thereto from said source and energy storage means when said solid-state switch means is in said conducting state;

unidirectional conducting means connectable with said load for conveying current thereto from said inductor means when said solid-state switch means is in said non-conducting state; and switch control netwsork means having an operational amplifier with a first input responsive to a charge level responsive signal corresponding with the said charge level of said energy storage means and a second input responsive to a reference level, and a switching output coupled with said solid-state switch means reference network means for deriving said reference level, said switch control network means actuating said solid-state switch means into conduction when said storage level responsive signal exceeds a said reference level and actuating said switch means into said non-conducting state when said charge level responsive signal is below said reference level.

26. The circuit of claim 25 in which said switch control network means includes capacitor means coupled with said second input for deriving an assured switching actuation performance of said amplifier.

27. The circuit of claim 25 in which said switch control network means includes feedback network means coupled between said switching output and said second input for enhancing the switching performance of said amplifier.

28. A solar panel assembly comprising;

a panel component having a photovoltaic region mounted upon a supportive substrate, and photovoltaic region having a panel output exhibiting variable voltage levels and substantially constant current and having a peak voltage level corresponding with the maximum power output of said panel component;

electrical junction means mounted with said panel for receiving said panel output and having external output terminal;

an output enhancement circuit mounted with said electrical junction means including:

energy storage means connectable across said panel output and chargeable at given rates by said current to variable charge levels;

solid-state switch means connected in energy transfer relationship with said energy storage means and actuable between conducting and non-conducting states;

inductor means connected with said solid-state switch means and with said external output terminals for conveying current thereto from said source and energy storage means when said solid-state switch means is in said conducting state;

unidirectional conducting means connected with said external output terminals for conveying current thereto from said inductor means when said solid-state switch means is in said non-conducting state;

switch control network means having a first input responsive to a charge level responsive signal corresponding with said charge levels of said energy storage means and a second input responsive to a reference level, and a switching output coupled with said solid-state switch means, said switch control network means being responsive to said charge level responsive signal and to said reference level to actuate said solid state switch means at frequencies varying in correspondence with said given rate of charge of said energy storage means to substantially maintain said panel peak voltage level.

29. A solar panel assembly comprising:

a panel component having a photovoltaic region mounted upon a supportive substrate, said photovoltaic region having a panel output exhibiting variable voltage levels including a peak voltage level and substantially constant current;

electrical junction means mounted with said panel for receiving said panel output and having an external output terminal;

an output enhancement circuit mounted with said electrical junction means including:

energy storage means connectable across said panel output and chargeable by said current to variable charge levels;

solid-state switch means connected in energy transfer relationship with said energy storage menas and actuable between conducting and non-conducting states; inductor means connected with said solid-state switch means and with said external output terminals for conveying current thereto from said source and energy storage means when said solid-state switch menas is in said conducting state;

unidirectional conducting means connected with said external output terminals for conveying current thereto from said inductor means when said solid-state switch means is in said non-conducting state;

switch control network means having an operational amplifier with a first input responsive to a charge level responsive signal corresponding with the said charge levels of said energy storage means and a second input responsive to a reference level, and a switching output coupled with said solid-state switch means, said switch control network means actuating said solid-state switch means into conduction when said storage level responsive signal exceeds a said reference level and actuating said switch means into said non-conducting state when said charge level responsive signal is below said reference level.

30. The assembly of claim 29 in which said switch control network means includes capacitor means coupled with said second input for deriving an assured switching actuation performance of said amplifier.

31. The assembly of claim 29 in which said switch control network means includes feedback network means coupled between said switching output and said second input for enhancing the switching performance of said amplifier.

32. An output enhancement circuit for driving a load of given current demands from an energy source having an output characteristic exhibiting variable voltage levels and a substantially constant current value and having a peak voltage level corresponding with the maximum power output of said source, comprising:

energy storage means connectable across said source and chargeable at given rates by said current to variable charge levels;

solid-state switch means connected in energy transfer relationship with said energy storage means and actuable between conducting and non-conducting states;

inductor means connected with said solid-state switch means and connectable with said load for conveying current thereto from said source and energy storage means when said solid-state switch means is in said conducting state;

unidirectional conducting means connectable with said load for conveying current thereto from said inductor means when said solid-state switch means is in said non-conducting state;

switch control network means including an operational amplifier exhibiting a given hysteresis characteristic, having first and second inputs, and a switching output coupled with said switch means, means deriving a reference level for assertion at said amplifier second input, means for applying charge levels corresponding with said source voltage levels at said amplifier first input, a feedback network including feedback capacitance means coupled between said switching output and said first input, said switch control network being responsive to said charge level at said first input and to said reference level to actuate said solid-state switch means into conduction when said charge level at said first input exceeds a said reference level and actuating said switch means into said non-conducting state when said charge level is below said reference level, the said switching actuation being developed in accordance with said hysteresis characteristic, and said means for applying charge levels and said reference level being selected for actuating said switch means at frequencies varying in correspondence with said given rate of charge said energy storage means to substantially maintain said source peak voltage level; and said feedback capacitance means having a capacitance value selected to enhance the rate of said switching actuation during the occurrence of elevated said load current demands.

33. The circuit of claim 32 in which said feedback capacitance means includes a variable capacitor adjustable to minimize the voltage range developed as said hysteresis characteristic effecting the said switch control network actuationg of said solid-state switch means into and out of conduction during said elevated current demands.

34. The circuit of claim 32 in which said feedback network includes resistor means coupled between amplifier first input and switching output and a first capacitor coupled in parallel circuit relationship with said resistor means.

35. The circuit of claim 34 further including second capacitor means coupled with said amplifier first input in divider circuit operative association with said first capacitor for performing therewith to enhance the switching response of said amplifier means ith respect to said given hysteresis characteristic.

36. The circuit of claim 34 in which said first capacitor is a variable capacitor adjusted to enhance said switching response.

37. An output enhancement circuit for driving a load from an energy source having output exhibiting variable voltage levels and substantially constant current, and having a peak voltage corresponding with maximum power output comprising:

energy storage means connectable across said output and chargeable at given rates by said current to variable charge levels;

solid-state switch means connected in energy transfer relationship with said energy storage means and actuable between conducting and non-conducting states;

inductor means connected with said solid-state switch means and connectable with said load for conveying current thereto from said source and energy storage means when said solid-state switch means is in said conducting state;

unidirectional conducting means connectable with said load for conveying current thereto from said inductor means when said solid-state switch means is in said non-conducting state;

switch control network means having a first input responsive to a charge level responsive signal corresponding with the said charge levels of said energy storage means and a second input responsive to a reference level, and a switching output coupled with said solid-state switch means, said switching output including emitter-follower stage means for enhancing the current values assertable therefrom, and said switch control network means being responsive to said charge level responsive signal and to said reference level to actuate said solid state switch means at frequencies varying in correspondence with said given rate of charge of said energy storage means to substantially maintain said source peak voltage level.

38. The output enhancement circuit of claim 37 in which said switch control network includes:

operational amplifier means having a said first input responsive to said charge level signal, a said second input responsive to said reference level, and an amplifier output;

voltage amplification stage means, responsive to said amplifier output for providing a voltage enhanced output; and said emitter-follower stage means being connectable across said output of said source and with said solid-state switch means and responsive to said voltage enhanced output for enhancing the current values assertable therefrom.

39. The output enhancement circuit of claim 38 in which:

said voltage amplification stage means is a transistor having its base coupled with said amplifier output and a collector connectable with said output;

said solid-state switch means is a field effect transistor having a gate;

said emitter-follower stage means is a transistor pair, the bases of which are coupled in common with said collector and having their emitters coupled in common with said field effect transistor gate.

40. The output enhancement circuit of claim 37 further comprising:

a supplementary power stage including:

supplementary energy storage means connectable across said output;

supplementary solid-state switch means connected in energy transfer relationship with said supplementary energy storage means and actuable between conducting and non-conducting states;

supplementary inductor means connected with supplementary solid-state switch means and connectable with said load for conveying current thereto from said source and supplementary energy storage means when said supplementary solid-state switch means is in said conducting state;

supplementary uni-directional conducting means connectable with said load for conveying current thereto from said supplementary inductor means when said supplementary solid-state switch means is in said non-conducting state; and means for connecting said switch control network means switching output with said supplementary solid-state switch means, said switch control network means actuating said supplementary solid-state switch means into conduction when said storage level responsive signal exceeds said reference level and actuating said supplementary switch means into said non-conducting state when said charge level responsive signal is below said reference level.

41. An output enhancement circuit for driving a load from an energy source having an output exhibiting variable voltage levels and substantially constant current and having a peak voltage level corresponding with maximum power output, comprising:

first energy storage means connectable across said output and chargeable at given rates by said current to variable charge levels;

first solid-state switch means connected in energy transfer relationship with said first energy storage means and actuable between conducting and non-conducting states;

first inductor means connected with said solid-state switch means and connectable with said load for conveying current thereto from said source and first energy storage means when said solid-state switch means is in said conducting state;

first uni-directional conducting means connectable with said load for conveying current thereto from said inductor means when said first solid-state switch means is in said non-conducting state;

switch control network means having a first input responsive to a charge level responsive signal corresponding with the said charge levels of said first energy storage means and a second input responsive to a reference level, and a switching output coupled with said first solid-state switch means, said switch control network means being responsive to said charge level responsive signal and to said reference level to actuate said solid state switch means at frequencies varying in correspondence with said given rate of charge of said energy storage means to substantially maintain said source peak voltage level;

a supplementary power stage including:

second energy storage means connectable across said output;

second solid-state switch means connected in energy transfer relationship with said second energy storage means and actuable between conducting and non-conducting states;

second inductor means connected with said second solid-state switch means and connectable with said load for conveying current thereto from said source and second energy storage means when said second solid-state switch means is in said conducting state;

second uni-directional conducting means conectable with said load for conveying current thereto from said inductor means when said second solid-state switch means is in said non-conducting state; and means for connecting said switch control network means switching output with said second solid-state switch means, said control network means actuating said second solid-state switch means into conduction when said storage level responsive signal exceeds said reference level and actuating said second switch means into said non-conducting state when said charge level responsive signal is below said reference level.

42. The output enhancement circuit of claim 41 in which said switch control network means switching output includes emitter-follower stage means for enhancing the current values effecting said actuation of said first and second solid-state switch means.

43. The output enhancement circuit of claim 42 in which said switch control network includes:

operational amplifier means having a said first input responsive to said charge level signal, a said second input responsive to said reference level, and an amplifier output;

voltage amplification stage means responsive to said amplifier output for providing a voltage enhanced output;

said emitter-follow stage means being connectable across said output and with said first and second solid-state switch means and responsive to said voltage enhanced output for selectively simultaneously actuating said first and second solid-state switch means.

44. The output enhancement circuit of claim 43 in which:

said voltage amplification stage means is a transistor having its base coupled with said amplifier output and a collector connectable with said output;

said first and second solid-state switch means respectively include first and second field effect transistors each having a gate;

said emitter-follow stage means is a transistor pair, the bases of which are coupled in common with said collector and having their emitter coupled in common with each said first and second field effect transistor gate.

* * * * *